(No Model.)
A. R. BOLUSS.
STRAIGHT AIR AUTOMATIC BRAKE.
No. 414,138. Patented Oct. 29, 1889.
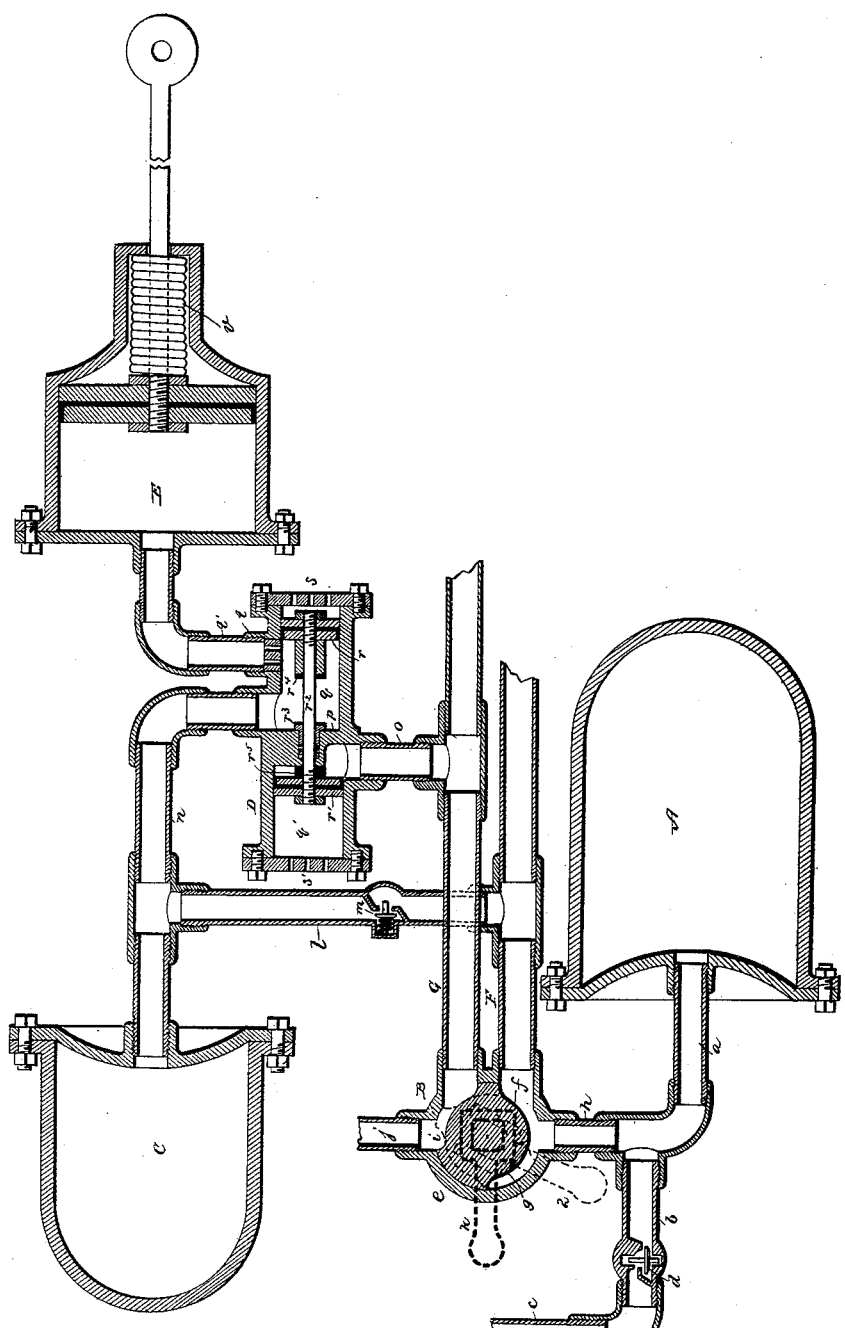
WITNESSES
F. L. Ourand
Harry G. Davis
INVENTOR
Alfred R. Boluss
by Ernest C. Webb
Wm. N. Fincrel, Asso. Atty.
Attorney

UNITED STATES PATENT OFFICE.

ALFRED R. BOLUSS, OF NORWOOD, OHIO, ASSIGNOR OF ONE-HALF TO HARVEY J. UBERT, OF NEW YORK, N. Y.

STRAIGHT-AIR AUTOMATIC BRAKE.

SPECIFICATION forming part of Letters Patent No. 414,138, dated October 29, 1889.

Application filed June 25, 1889. Serial No. 315,463. (No model.)

*To all whom it may concern:*

Be it known that I, ALFRED R. BOLUSS, a citizen of the United States, residing at Norwood, in the county of Hamilton, in the State of Ohio, have invented a new and useful Improvement in Straight-Air Automatic Brakes, of which the following is a full, clear, and exact description, reference being had to the accompanying drawing, forming part hereof.

The invention consists of brake apparatus for railway-trains in which straight air—that is to say, air flowing directly from the main reservoir—fills the auxiliary reservoir and passes through the valve mechanism to operate it, and thence passes to the brake-cylinder to set the brakes, the brakes being released automatically upon the breaking or parting of the train or by manipulation of the engineer's valve, substantially as described and claimed.

The drawing shows in sectional plan one form of apparatus embodying my invention, and for the sake of conciseness I will confine the description of the invention to the form illustrated in said drawing.

A is the main reservoir, connected with any suitable pumping apparatus through the pipes *a b c*, in which is interposed a check-valve *d* to prevent backflow of air from the reservoir.

B is the engineer's valve, the specific construction of which will be presently described.

C is the auxiliary reservoir.

D is the "triple valve," so called, and E is the brake-cylinder.

The main reservoir, auxiliary reservoir, and brake-cylinder may be of ordinary construction. The engineer's valve and the triple valve are of peculiar construction and form part of the present invention, as will appear in the claims herein made.

Two lines of pipes F G are employed, and each line is connected with each valve, and each auxiliary reservoir of the train and the said lines of pipes extend from the engineer's valve B. This valve B is composed of a shell *e*, in which is arranged a plug *f*, having a port *g* large enough to open communication between the branch pipe *h*, which connects the said valve with the main reservoir, and the two lines of pipe F and G. The plug is also provided with a port *i* large enough to open communication between the line of pipe G and the exhaust *j* to the atmosphere. The plug *f* is provided with a handle *k* or other suitable operating device for rotating it within the shell *e*. The pipe F is connected by a branch pipe *l* with each of the auxiliary reservoirs, and in the branch pipe *l* is arranged a check-valve *m*, opening against pressure of incoming air and closing against the outflow of air from the auxiliary reservoir. The pipe *l* is connected to a branch pipe *n*, which extends from the auxiliary reservoir to the triple valve D, so that there is a direct passage from the main reservoir to the auxiliary reservoir and to the triple valve for the incoming air. The line of pipe G is connected by branch pipes *o* with the triple valve of each car. The connections of the pipes *n* and *o* with the triple valve are made upon opposite sides of the diaphragm *p*, which separates the triple valve into two chambers *q* and *q'* of unequal area. In the chamber *q* is arranged a piston *r*, and in the chamber *q'* is arranged another piston *r'*, which has an area about one-third greater than that of piston *r*. A stem $r^2$ is common to the two pistons and works through a gland or stuffing-box $r^3$ in the diaphragm or wall *p*, which divides the triple valve into two chambers, as just described. The pistons *r* and *r'* may be of any suitable construction. I have shown them as composed of two metallic plates, between which are interposed cup-leathers, and washers $r^4$ and $r^5$ may be interposed between the pistons and the diaphragm *p*, in order to cushion the stroke of the said pistons as they come in contact with the diaphragm.

The heads *s s'* of the triple valve may be perforated or provided with openings in order to permit the escape of exhaust or leakage.

The chamber *q* of the triple valve has an outlet *t*, connected by a branch pipe *t'* with the brake-cylinder, and I prefer to contract the openings in such outlet in order to so control the air as to permit the brakes to set gradually and release rapidly, and this purpose may be further subserved by making these outlets smaller at their ends within the valve than at their ends within the pipe *t'*.

The operation is substantially as follows: The engineer's valve B being in the position shown in full lines, the air from the main reservoir passes through the line of pipes F into the auxiliary reservoir and into the triple valve, and acting against the piston $r$ drives it past the outlet $t$, and so permits the air to pass into the brake-cylinder and set the brakes. It will be observed that the air goes straight from the main reservoir to the brake-cylinder, and that the supply of air is constant so long as the pump is going, so that in going down grades the run may be continuous and under constant pressure of the air on the brakes, and thus the necessity for frequent stoppings to refill the main reservoir and the auxiliary reservoir are avoided. When it is desired to release the brakes, the engineer's valve is thrown over into the position indicated by dotted lines, (the handle $k$ of the valve being then in the position shown at 2,) whereby air will pass from the main reservoir into the pipe G, as well as into the pipe F, and entering the triple valve through the pipe $o$ under equal pressure will meet the larger area of the piston $r'$, and thereby move the said piston and of course the piston $r$, so as to pass the outlet $t$ in the other direction and permit the air from the brake-cylinder to flow out of the chamber $q$ through the perforated head $s$ into the atmosphere, and thus permit the spring $v$ or other device to release the brakes.

Should the train break while the brakes are on and the engineer's valve is in the position shown in full lines, then the check-valve $m$ would be seated and the pressure in the auxiliary reservoir would serve to automatically hold on the brakes. Thus I provide for working the brakes by straight air, and also automatically, as those terms are commonly understood in this art.

To again set the brakes after having been once released and the train being intact, the engineer's valve is moved into the full-line position, which cuts off the supply of air to the pipe G, while continuing it to the pipe F, and at the same time opens the pipe G through the port $i$ to the outlet $j$ and the atmosphere, thus taking pressure off of the piston $r'$ and again permitting the air to work through the auxiliary reservoir and pipes to the triple valve upon the piston $r$.

As will be observed, the triple valve is of exceedingly simple construction, and the operation being positive and direct the brake system becomes one of great simplicity and great power.

What I claim is—

1. A straight-air automatic brake comprising a main reservoir, two lines of pipes, an engineer's valve interposed between the main reservoir and the two lines of pipes and having a port to open communication between the main reservoir and one or both lines of pipes and another port to open communication between one line of pipe only and the atmosphere, an auxiliary reservoir, a triple valve comprising two pistons moving together and of unequal area and arranged in isolated chambers, the smaller piston and chamber communicating directly with one of the lines of pipes and the auxiliary reservoir and with the brake-cylinder, and the other chamber containing the larger piston communicating with the other line of pipe and the atmosphere, substantially as described.

2. A triple valve comprising a shell divided into two compartments isolated from one another and of unequal area and pistons of corresponding inequality as to area arranged in the said compartments or chambers and rigidly connected by a stem common to both, combined with two lines of pipes, both of which are adapted to be put into open communication with a main reservoir, and one of which is always in such communication, and is also open to the smaller chamber of the triple valve, and thence to the brake-cylinder to set the brakes, and the other of which opens into the larger chamber of the triple valve and may be opened to the main reservoir to release the brakes and then opened to the atmosphere to permit the escape of the air for permitting the setting of the brakes, substantially as described.

3. A straight-air automatic brake comprising a main reservoir, two lines of pipes, an engineer's valve interposed between the main reservoir and the two lines of pipes and having a port to open communication between the main reservoir and one or both lines of pipes, and another port to open communication between one line of pipe only and the atmosphere, an auxiliary reservoir, a check-valve interposed in a branch pipe connecting the auxiliary reservoir with the main line of pipe, a triple valve comprising two pistons moving together and of unequal area and arranged in isolated chambers, the smaller piston and chamber communicating directly with one of the lines of pipes and the auxiliary reservoir and with the brake-cylinder, and the other chamber containing the larger piston communicating with the other line of pipe and the atmosphere, substantially as described.

In testimony whereof I have hereunto signed my name this 20th day of June, 1889.

ALFRED R. BOLUSS.

Witnesses:
WM. H. FINCKEL,
E. A. FINCKEL.